(No Model.)
H. J. SCHNEIDER.
ROAD GRADER.
No. 479,466. Patented July 26, 1892.
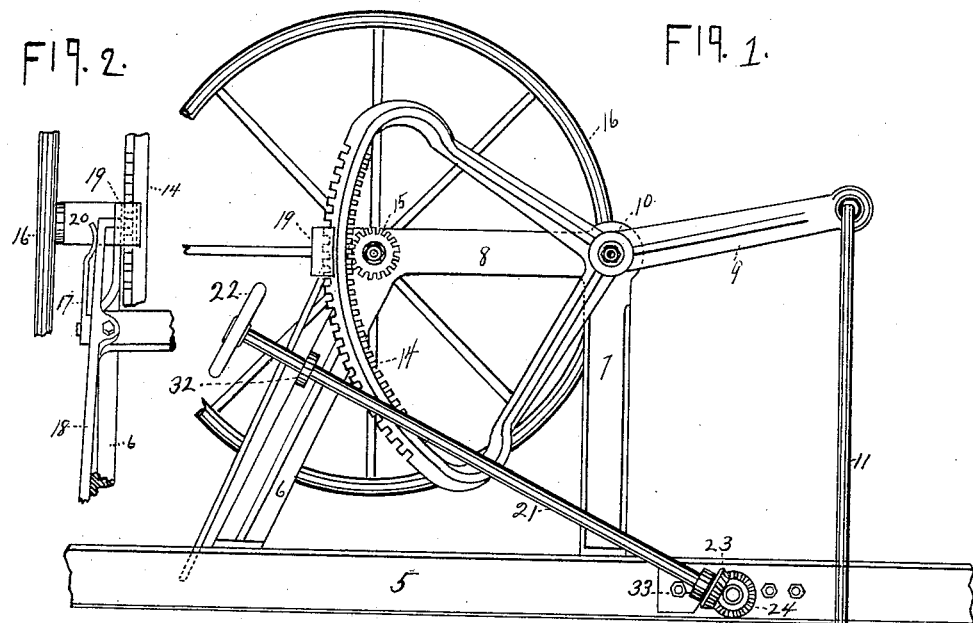
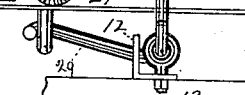
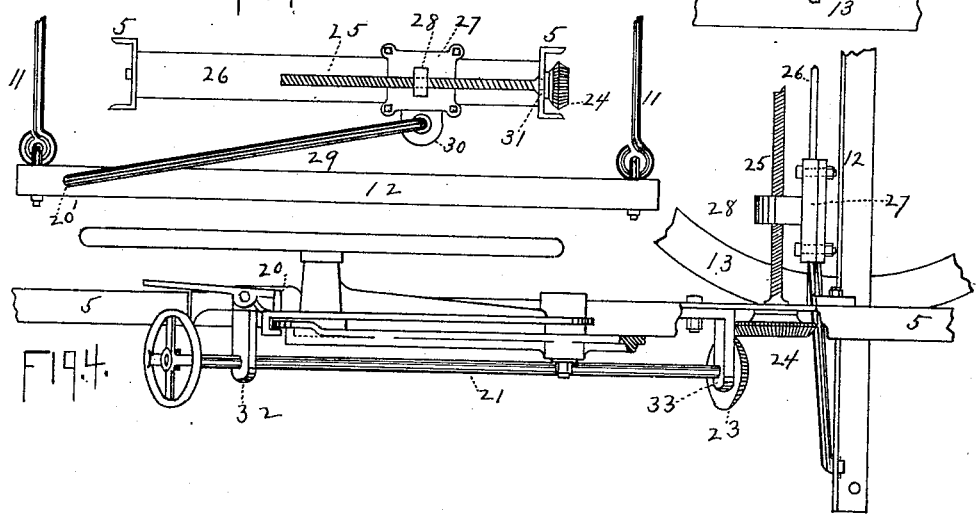
WITNESSES:
Albert Baker
P. Buckland
Henry J. Schneider  INVENTOR
BY
H. C. Hartman
ATTORNEY

United States Patent Office.

HENRY J. SCHNEIDER, OF FORT WAYNE, INDIANA, ASSIGNOR TO CHARLES PAPE, OF SAME PLACE.

ROAD-GRADER.

SPECIFICATION forming part of Letters Patent No. 479,466, dated July 26, 1892.

Application filed March 18, 1892. Serial No. 425,396. (No model.)

*To all whom it may concern:*

Be it known that I, HENRY J. SCHNEIDER, a citizen of the United States, residing at Fort Wayne, in the county of Allen, in the State of Indiana, have invented certain new and useful Improvements in Road-Graders; and I do hereby declare that the following is a full, clear, and exact description of the invention, which will enable others skilled in the art to which it appertains to make and use the same, reference being had to the accompanying drawings, which form part of this specification.

My invention relates to road-graders in which the scraper-blade and its attachments are supported from a frame mounted on wheels. Its objects are to provide an improved horizontal shifting device for moving the scraper-blade and its attachments laterally from one side of the supporting-frame to the other, and also to provide improved means of vertically-secured adjustment of the scraper-blade.

Figure 1 is a side view showing the vertically-adjusting devices and a part of the horizontal shifting device. Fig. 2 is a back view of part of the vertically-adjusting device, showing the means of locking the lever. Fig. 3 is a side view of part of the horizontal shifting device attached to the supporting-bar of the scraper-blade and its attachments. Fig. 4 is a top view of the horizontal shifting devices with certain parts broken away to show the mechanism.

In the drawings I have shown only so much of one side of the frame 5, which is mounted on the wheels, as is necessary to show the attachments thereto of my devices. The vertically-adjusting devices are in duplicate and attached to both sides of the frame 5. This device consists of two supports 6 and 7, rigidly attached to the frame 5 and connected at their upper ends by the cross-bar 8. A lifting-lever 9 is pivoted to the forward end of the cross-bar 8 at its junction with the support 7. The pivot 10 constitutes the fulcrum of the lever 9. To the forward end of this lever 9 is attached a lifting-rod 11, preferably by hook and eye, as shown in Fig. 1. The lower end 11 is attached in like manner to the angle-bar 12, which sustains the ring 13, with its other attachments and the scraper-blade; or the bar 12 may be attached to a circular draw-bar, such as is illustrated in Patent No. 454,048. The other end of the lever 9 is bifurcated, the bifurcated ends being connected by a segment-rack 14, constructed with rack-teeth on both its outer and inner curves. A pinion 15 meshes with the rack-teeth on the inner curve of the segment-rack and is operated by a hand-wheel 16. The teeth on the outside curve of the segment-rack 14, with a portion of the segment, move through and are confined in place by a lug 19, provided with a slot therefor. A spring-lever 18 is provided with a pin 20, which passes through a hole in the lug 19 and engages the teeth of the segment-rack, thereby locking the lever 9 at any given elevation, the spring 17 being adapted to hold the pin 20 firmly in place. When it is desired to change the elevation of the lever 9, this pin 20 is disengaged by using the spring-lever 18, and the pin is thereby held out of engagement, while the operator by turning the hand-wheel 16 makes the desired change, and then upon releasing the spring-lever 18 the pin 20 is forced into engagement with the segment-teeth as before. A similar construction is provided for the other side of the frame 5, and the two acting independently raise or lower either end of the supporting-bar 12, with its attachments, so that the scraper-blade is placed and held at any desired angle to the road-bed. The spring-lever and pin 20 are my preferred means for locking the lever 9; but the pin may be used without the lever 18 or any other suitable means therefor, as may be desired.

The horizontal shifting devices consist of a rod 21, journaled in a bearing in a lug 32, attached to the supporting-arm 6, and also journaled in a bearing in a lug 33, attached to the frame 5 in the manner substantially as shown in Fig. 1. One end of this rod 21 is provided with a hand-wheel 22, and the other end with a beveled gear-wheel 23, which meshes into another beveled gear wheel 24, attached in a threaded rod 25. This threaded rod 25 is journaled in a bearing 31 in the frame 5, with collars or other means on both sides of the bearing to prevent lateral motion of the rod 25. This rod 25 engages a screw-collar 28, attached to a follower 27, which follower slides upon a cross-bar 26, secured at right angles to and between the two sides of the frame 5. The follower 27 is also provided with a lug 30, to which is pivotally attached a shifting-rod 29, the other end of which rod is pivotally attached to the supporting-bar 12 at the end opposite from the gear-wheels and preferably by a hook 20', passing through a hole in the bar 12, as shown in Fig. 3.

The operation is as follows: Revolving the hand-wheel 22 operates the screw on the rod 25, and thereby moves with great force and precision the supporting-bar 12 either toward or from the bearing 31. This shifts the supporting-bar 12 and its attachments to the right or left of the grader, as desired. The screw-collar 28 may, if desired, be rigidly attached directly to the end of the shifting-rod 29, omitting the intermediate mechanism of the bar 26 and follower 27 with its lug 30, and the supporting-bar be shifted, substantially as before. In such case the bearing 31 in the frame 5 should be adapted to oscillate slightly to accommodate it readily to any changes of direction of the rods 25 and 29, caused by the elevation or lowering of either end of the supporting-bar 12; but I prefer the construction shown.

Having thus described my invention, what I claim as new, and desire to secure by Letters Patent, is—

1. In a road-grader having a frame mounted on wheels, the combination of a bar supporting the scraper-blade and its attachments, with a lifting-lever fulcrumed to suitable supports, bifurcated at one end and having lifting-rods pivotally attached at the other end, with suitable connections to said supporting-bar, the bifurcated ends being connected by a segment provided with teeth on both its inner and outer curves, a pinion meshing with the teeth on the inner curve of said segment and provided with a journal supported in suitable bearings attached to a hand-wheel, a lug provided with a slot adapted to receive and guide therein the teeth on the outer curve of said segment with part of the segment, a spring-lever provided at one end with a pin and adapted to enter an orifice in said lug and engage the outer teeth of said segment, an operating-rod provided with a beveled gear-wheel meshing with another beveled gear-wheel, to which is attached a threaded rod, both rods being journaled suitably in bearings, a follower mounted on a cross-bar attached to said frame, a screw-collar attached to said follower and adapted to engage said threaded rod, and a shifting-rod pivotally attached one end to said supporting-bar and the other to a lug attached to said follower.

2. In a road-grader having a frame mounted on wheels, the combination of a bar supporting the scraper-blade and its attachments, with a lifting-lever fulcrumed to suitable supports, bifurcated at one end and having lifting-rods pivotally attached at the other end, with suitable connections to said supporting-bar, the bifurcated ends being connected by a segment provided with teeth on both its inner and outer curves, a pinion meshing with the teeth on the inner curve of said segment and provided with a journal supported in suitable bearings attached to a hand-wheel, a lug provided with a slot adapted to receive and guide therein the teeth on the outer curve of said segment with part of the segment, and a spring-lever provided at one end with a pin adapted to enter the orifice in said lug and engage the outer teeth of said segment.

3. In a road-grader having a frame mounted on wheels, the combination of a bar supporting the scraper-blade and its attachments, an operating-rod provided with a beveled gear-wheel meshing with another beveled gear-wheel, to which is attached a threaded rod, both rods being journaled suitably in bearings, a follower mounted on a cross-bar attached to said frame, a screw-collar attached to said follower and adapted to engage said threaded rod, and a shifting-rod pivotally attached one end to said supporting-bar and the other to a lug attached to said follower.

4. In a road-grader having a frame mounted on wheels, the combination of a bar supporting the scraper-blade and its attachments, an operating-rod provided with a beveled gear-wheel meshing with another beveled gear-wheel, to which is attached a threaded rod, both rods being journaled suitably in bearings, a shifting-rod pivotally attached to said supporting-bar, and a screw-collar rigidly attached to said shifting-rod and adapted to engage said threaded rod.

5. In a road-grader having a frame mounted on wheels, the combination of a bar supporting the scraper-blade and its attachments, with a lifting-lever fulcrumed to suitable supports, bifurcated at one end and having lifting-rods pivotally attached at the other end, with suitable connections to said supporting-bar, the bifurcated ends being connected by a segment provided with teeth on both its inner and outer curves, a pinion meshing with the teeth on the inner curve of said segment and provided with a journal supported in suitable bearings attached to a hand-wheel, a lug provided with a slot adapted to receive and guide therein the teeth on the outer curve of said segment with part of the segment, and means to lock said lifting-lever at any desired elevation.

In testimony whereof I hereunto subscribe my name, in the presence of two witnesses, this 1st day of February, A. D. 1892.

HENRY J. SCHNEIDER.

Witnesses:
ARTHUR FITZSIMONS,
H. C. HARTMAN.